Sept. 5, 1939.  F. S. CHILTON  2,172,059
APPARATUS FOR DEHYDRATING FOOD PRODUCTS
Filed Aug. 13, 1937  4 Sheets-Sheet 1

INVENTOR
Forrest S. Chilton
BY
HIS ATTORNEY

Sept. 5, 1939.  F. S. CHILTON  2,172,059
APPARATUS FOR DEHYDRATING FOOD PRODUCTS
Filed Aug. 13, 1937  4 Sheets-Sheet 2
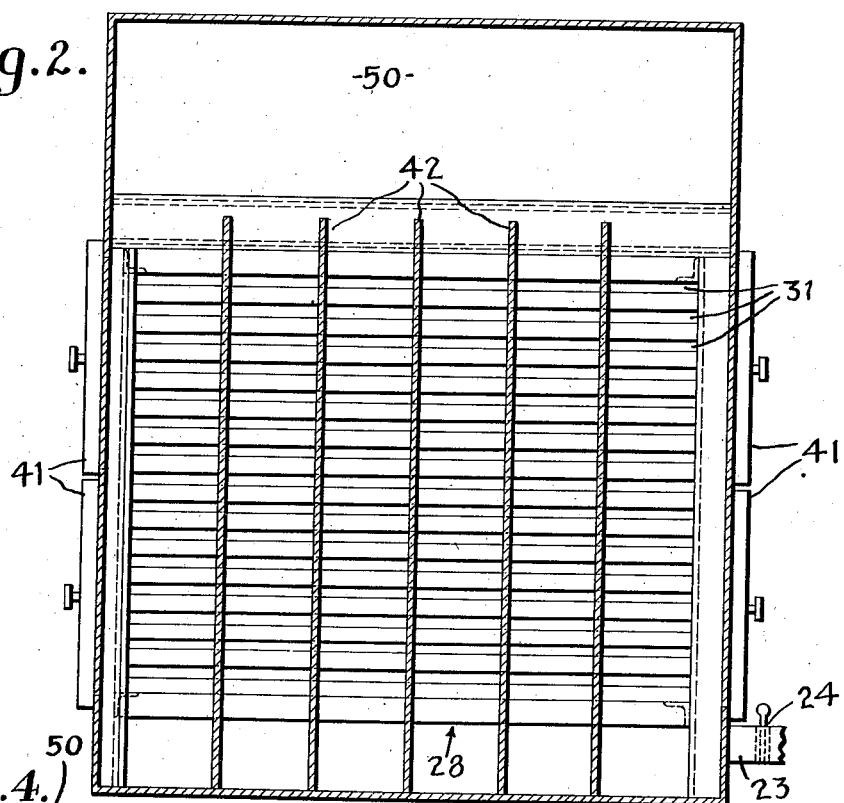
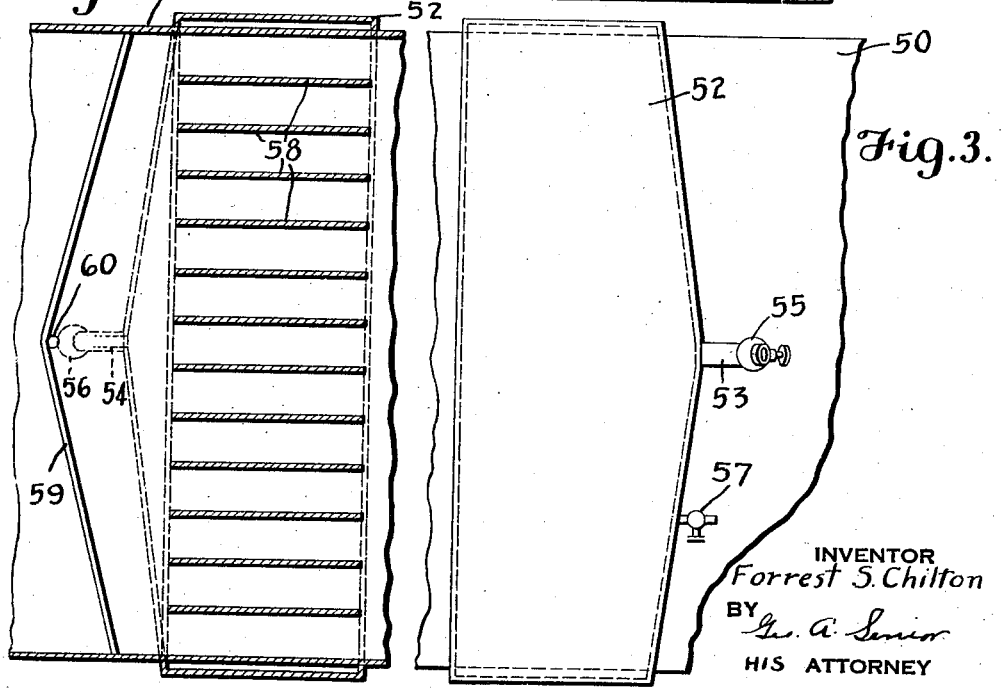
INVENTOR
Forrest S. Chilton
BY
HIS ATTORNEY

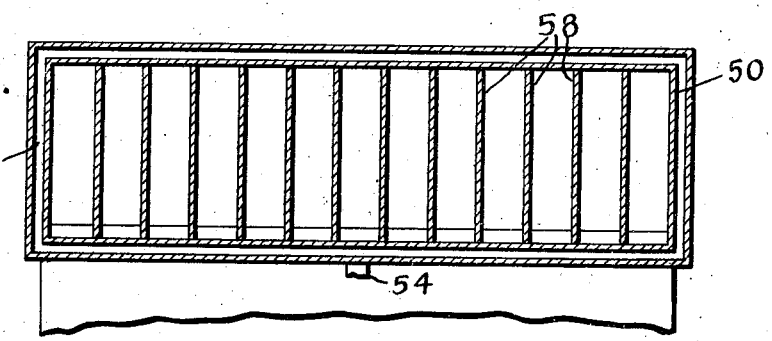
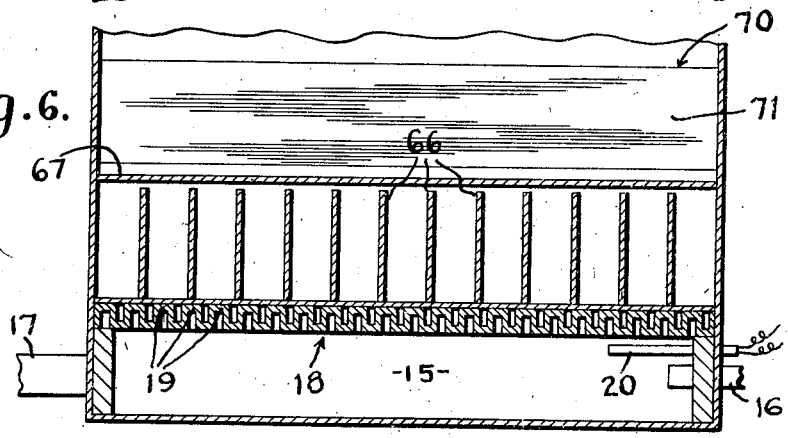
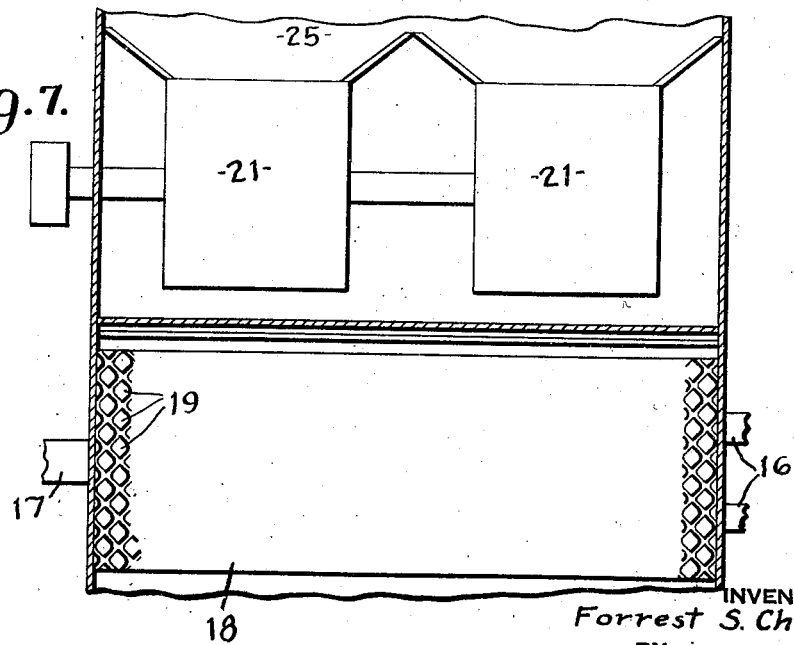

Sept. 5, 1939.  F. S. CHILTON  2,172,059
APPARATUS FOR DEHYDRATING FOOD PRODUCTS
Filed Aug. 13, 1937  4 Sheets-Sheet 4
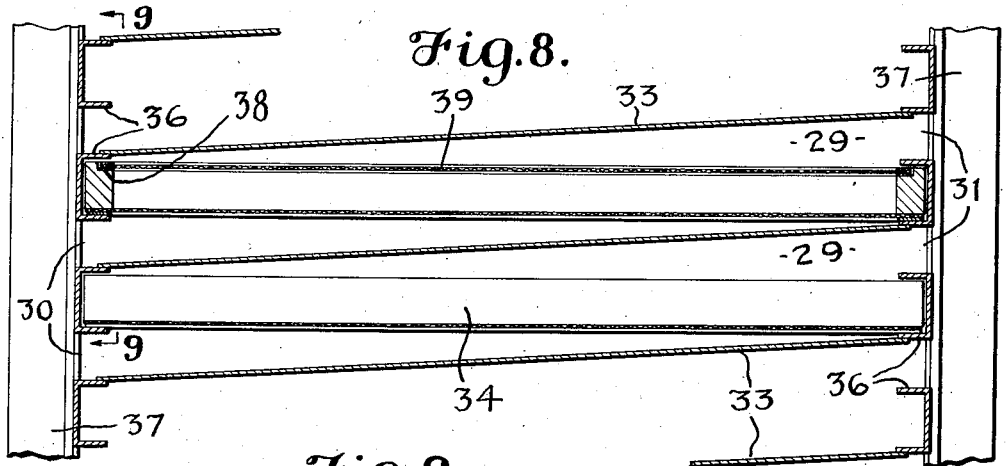
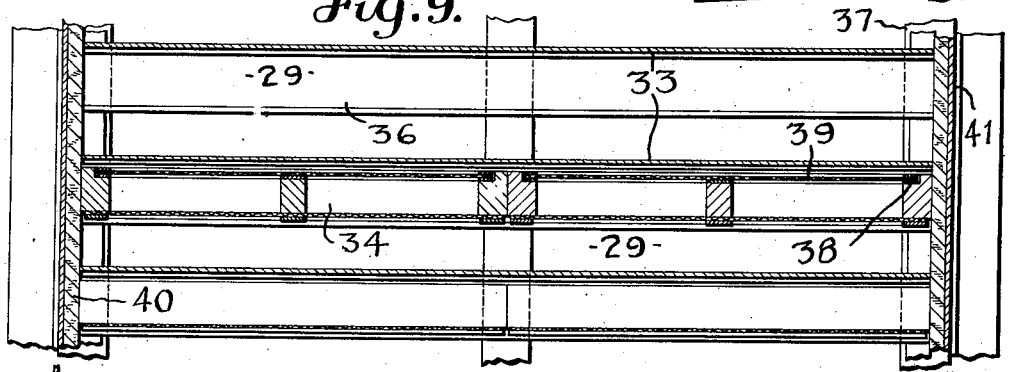
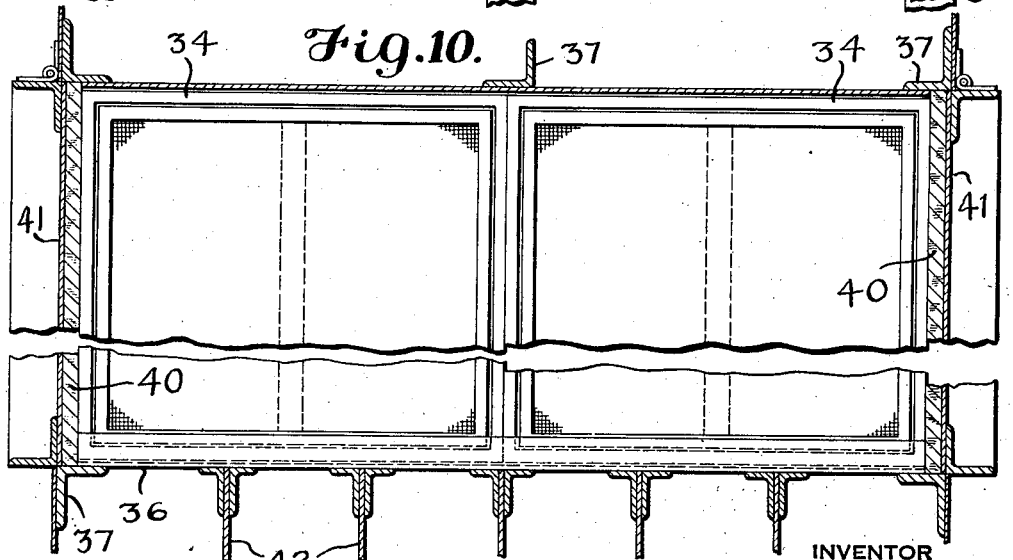
INVENTOR
Forrest S. Chilton
BY
HIS ATTORNEY Patented Sept. 5, 1939

2,172,059

UNITED STATES PATENT OFFICE 2,172,059

APPARATUS FOR DEHYDRATING FOOD PRODUCTS

Forrest S. Chilton, Pompton Plains, N. J.

Application August 13, 1937, Serial No. 158,834

7 Claims. (Cl. 34—39)

The invention relates to an apparatus for dehydration of food products by an air medium. However, the apparatus is applicable for use in any other drying operations.

During dehydration food products are in a state conducive to impregnation with bacteria, fungi, spores, etc., carried by the air. Such impregnation renders the dehydrates extremely dangerous to the life and health of consumers and prone to early deterioration. One of the principal objects of the present invention is to provide for the instantaneous destruction of such bacteria, fungi, spores, etc.

Minimizing of oxidation is one of the objects always sought to be accomplished in the dehydrating apparatus field. I have discovered that there is no perceptible oxidation when the materials are constantly subjected and resubjected to rapid moving currents of oxidases free air, without change of air during the operation.

Another serious difficulty to overcome is that of case hardening with the resulting failure to dehydrate the inner cells of the material. I have found that this danger can be obviated by maintaining a relative humidity close to the saturation point accompanied by a temperature a little below the cooking point until the inner cells of the material are thoroughly heated and then slowly reducing the temperature and relative humidity during the balance of the operation.

I have also discovered that completing a dehydrating operation without change of air is conducive to retention of aroma and flavor and my dehydrating apparatus has been designed accordingly.

The invention also provides means for preventing unevenness of dehydration in separate tray compartments due to insufficient mixing of the medium composites, and the lack of uniformity of volume, density, pressure, and velocity of the air contacting the materials.

The process of dehydrating food products by the medium of warm air is well known in the art. Accelerating the air movements by fan blowers and utilizing recirculation, condensing, re-heating and separate tray compartments such as disclosed in United States Patents Nos. 810,974 to Perkins, 1,523,509 to Braemer, and 1,601,966 to Harris, are also well known. However, the improvements and refinements heretofore mentioned and others that will be apparent as the specification proceeds are thought to be novel.

Referring to the drawings accompanying and forming a part of this specification in which an embodiment of the invention is illustrated:

Fig. 2 is a transverse sectional view taken on line 2—2 of Fig. 1;

Fig. 3 is a fragmentary plan view of the part of the recirculating duct to which the jacket for the cooling medium is applied. This view is taken on line 3—3 of Fig. 1;

Fig. 4 is a framentary detail sectional view taken on line 4—4 of Fig. 1;

Fig. 5 is a detail cross sectional view taken on line 5—5 of Fig. 1;

Fig. 6 is a fragmentary detail transverse sectional view taken on line 6—6 of Fig. 1;

Fig. 7 is a fragmenetary sectional plan view taken on line 7—7 of Fig. 1;

Fig. 8 is a fragmentary sectional view on a large scale, showing details of the tray type cabinet;

Fig. 9 is a sectional view taken on line 9—9 of Fig. 8; and

Fig. 10 is a sectional plan view.

Figure 1:
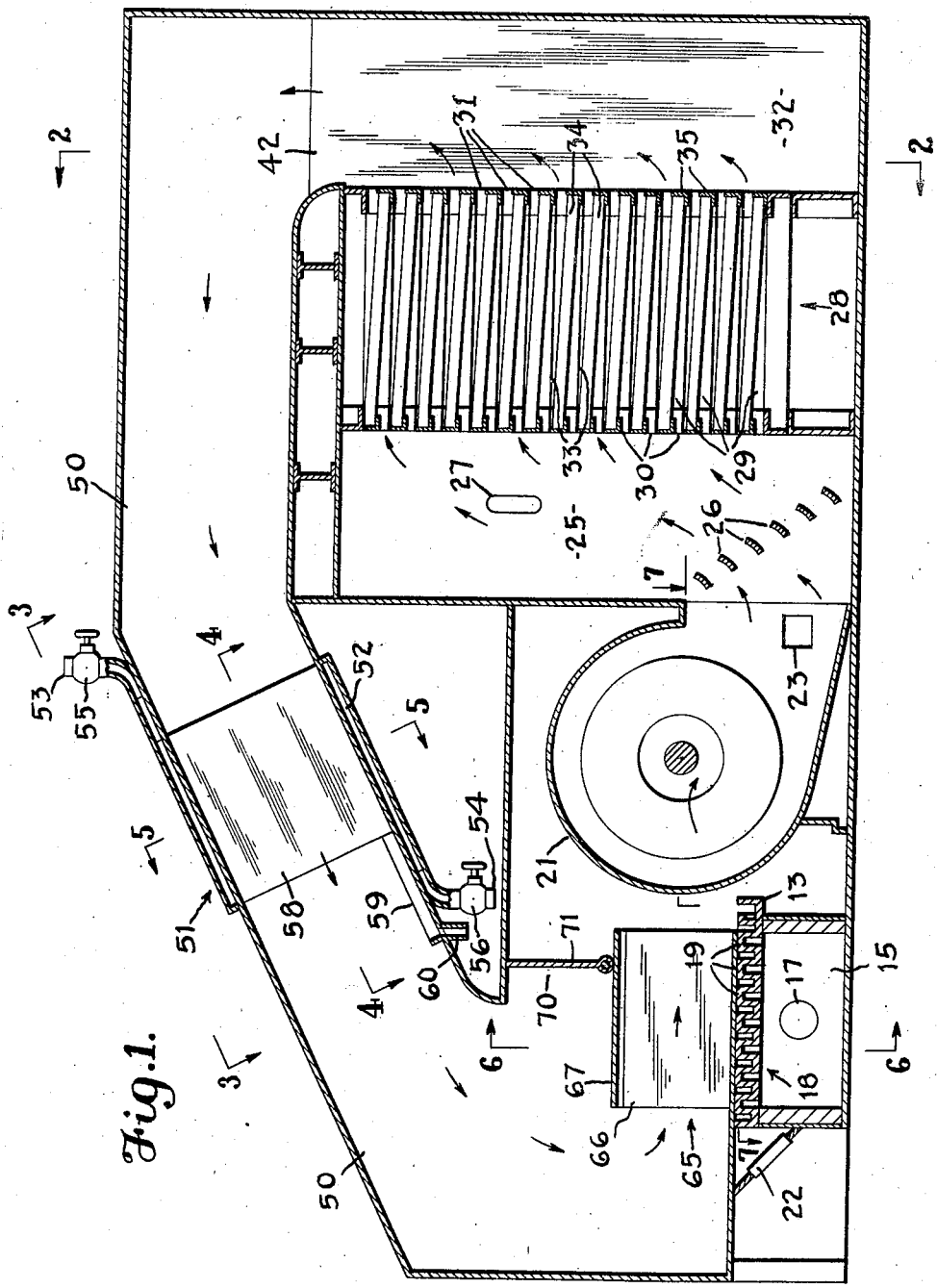
Fig. 1 is a longitudinal sectional view of the dehydrating apparatus.

Referring again to the said drawings, the reference numeral 15 designates a fire box to which heat may be supplied by oil or gas burners schematically indicated at 16, the products of combustion passing out through a flue 17.

The space directly above the fire box forms a preheating compartment and this compartment is occupied by a sterilizing unit 18 which rests on the walls of the fire box. The sterilizing unit is preferably made of a casting and as shown in Figs. 1, 6 and 7 comprises what might be termed a plate, formed with series of upwardly extending hollow bosses 19 provided with substantially flat tops. The incoming air passes through the channels between the numerous bosses. In accordance with the foregoing construction a sterilizing unit is provided which has an extremely large radiating surface. It is kept heated to between an incipient and a cherry red, giving at least 500 degrees centigrade, which is sufficient to instantly destroy the air contained bacteria, fungi, spores and oxidases coming in contact therewith. A conventional pyrometer 20 may be utilized to ascertain the temperature in the preheating compartment.

The fresh air supply is drawn by the fan blowers 21 through a dry filter indicated diagrammatically at 22. A flue 23 leading to a stack (not shown) is provided with a damper 24. When it is desired to admit fresh air to the unit the flue damper 24 is opened and the fan blowers 21 draw the air in. When sufficient heated purified fresh air has been admitted the damper 24 is closed and the air in the unit is then recirculated and reheated. Any loss of air due to leakage or opening the door hereinafter described, to insert the trays of food products to be dehydrated will be compensated for by additional air drawn in through the filter. A water trough 13 is positioned on the fan blower side of the sterilizing unit. Water may be supplied to this trough in any convenient manner when additional moisture is desired.

The fan blowers 21, of which there may be any desired number, two being illustrated in the present instance, draw the fresh air through the dry filter 22 and the sterilizing unit 18, mixing it with recirculated air and added moisture and compressing it into an induction duct or compartment 25. Baffles 26 may be utilized to aid in shunting the heated air upwardly in the induction duct, as indicated by the arrows in Fig. 1. A well known type of wet and dry bulb thermometer system, indicated diagrammatically at 27, may be utilized for indicating the temperature and moisture content of the air in the induction compartment.

From the induction duct the heated purified air is compressed into a tray cabinet indicated generally at 28. This tray cabinet comprises a plurality of compartments 29, each of which has an intake 30, extending substantially across the unit, and an outlet 31 on the opposite side, the outlets leading into the eduction duct or compartment 32. The compartments 29 are formed by partitions 33 running parallel to the base. The trays 34 are set diagonally on angles 35, to which the partitions are secured, and the air comes in under the trays and is compressed through them and out of the outlets 31. As stated, the trays may rest on the angle 35. However, a preferred form of tray cabinet is illustrated in Figs. 8, 9 and 10. In this form channel guides 36 are welded or otherwise secured to upright angles 37. The channels are arranged so that when the trays 34 are slid therein the trays will rest parallel to the base. The partitions 33 are angularly disposed in relation to the base and their edges at one end secured to the lower flange of one of the channel guides 36 and at the other end to the upper flange of the adjacent channel guide. The trays are preferably constructed of a wooden frame to the bottom of which is suitably attached a sheet of wire mesh or other foraminous material. To facilitate handling two trays may be provided for each compartment and, as will be noted, particularly in Figs. 9 and 10, the sides of the trays and the ends of the channel guides and the partitions are all substantially flush. Sealed tight doors 41 are provided on both sides of the cabinet to permit of loading from either side. These doors are preferably made of sheet metal provided with a cork lining 40. This cork lining butts against the sides of the trays and the ends of the channel guides and partitions and insures the sealing of each compartment. The tops of the trays are recessed at 38 to accommodate covers 39 formed of wire mesh or other foraminous material. The covers may readily be dropped in place and when the trays are positioned in the tray cabinet the channel guides will prevent any possibility of the covers being displaced. The covers insure against overloading the trays, maintain an even distribution of food products in the trays and prevent any possibility of the food products being displaced when the air is being forced through them during the dehydrating process.

The eduction duct 32 is preferably divided into a plurality of compartments by partitions 42. Inverted spiral air movements occur when relatively rapid moving crossing currents of air contact with any relatively stationary substance. The suction power of such movements is due to vacuum created by centrifugal expansion as the air moves from its point of starting and comparative confinement. Such cross currents and inverted spiral movements may be artificially created by rapidly drawing or forcing air from a common source into separate channels. This beneficial result is accomplished by splitting the eduction duct into compartments by means of the partitions 42. The common source of air is the intake 30 of the compartments in the tray cabinet. The combined currents and cross currents thus formed give a more even distribution over the products in the trays and the suction power of the spirals materially contributes to shorten the dehydration operation time.

From the eduction duct 32 the air is drawn by the fan blowers into the recirculation duct 50. Part of the recirculating duct slopes downwardly and in the downwardly sloping portion is located a cooling and condensing unit 51, particularly illustrated in Figs. 1, 3, 4 and 5. This unit comprises a jacket 52 surrounding the recirculation duct and provided with an inlet 53 and an outlet 54. The inlet and outlet are valve controlled by valves indicated at 55 and 56. A vent 57 (see Fig. 3) may be provided for the escape of air when initially filling the jacket with its cooling medium. By regulating the valves 55 and 56 a positive control is provided for the amount of cooling medium it is desired to use.

Substantially coextensive with the jacket for the cooling medium the recirculation duct is provided with a plurality of partitions 58. These partitions materially add to the cooling surface. A trough 59 takes care of the products of condensation and the trough is provided with an outlet 60 which may lead to a sewer or any suitable drain.

From the recirculation duct the air is drawn by the fan blowers through a reheating unit 65. The reheating unit (see Figs. 1 and 6) rests on the flat tops of the hollow bosses 19 of the sterilizing unit 18. The reheating unit has a plurality of fins 66 which terminate short of the top wall 67 of the unit. The heat from the sterilizing unit is conducted into the bottom and side walls of the reheating unit and the fins 66 greatly add to the radiating surface. From the reheating unit the air is compressed by the fan blowers into the induction duct and again follows the course heretofore described, the course of the air being indicated by the arrows in Fig. 1.

Above the reheating unit is located a by-pass passage 70, having a control damper 71. In dehydrating certain products, or in the course of the dehydration process it is sometimes necessary to control the extent of reheating. By regulating the damper 71 the operator is readily enabled to control the proportion of air passing through the reheating unit and the by-pass passage.

In the operation of the machine the sterilizing unit is heated. It has been found in practice a temperature of 500 degrees centigrade, will instantly destroy all bacteria, fungi, spores and oxidases contained in the air. The damper 24 in the outlet flue is opened and the fans are set in motion. It is desirable to maintain an air duct velocity of not less than 1000 feet per minute. When the machine is filled with sterilized air the damper 24 is closed. Moisture is now added from the trough 13 and the air is recirculated until the heat content does not exceed 160 degrees Fahrenheit and the relative humidity is approximately 95%, or just below the saturation point. The dehydration process is completed without changing the air. After the inner cells of the material are heated, the relative humidity and temperatures are gradually reduced until the temperature is about 110 degrees and the humidity about 60 per cent. The tray cabinet being within the compression area of the blower no air will be admitted from the outside when the doors 41 are opened to insert the trays. Any air that is lost will be automatically restored by the fan blower drawing additional air through the filter 22 and sterilizing unit 18.

It will be noted from the drawings that the air circulating and recirculating ducts are all of the same capacity. That capacity equals the aggregate capacity of the separate intakes to the tray cabinet. The advisability of such a construction can be readily seen if an extreme case is presented. It requires no argument to show that an induction duct with an intake capacity of 1 inch would not admit sufficient air to adequately supply two 1 inch tray compartment inlets. The same reason exists for having an eduction duct of the equal capacity to or greater than the aggregate of the tray compartment intakes. Otherwise only the tray compartments nearest the suction fan would have the air adequately removed therefrom. Moreover it is not safe to materially reduce the ducts in any part of the machine below that same capacity.

It is also to be noted that the air intakes to the various compartments are all equal. This is an indispensable requirement. It has been found in practice that intakes 1½ inches wide are adequate for trays 30 inches wide loaded 1½ inches deep. It is to be further noted that the air outlets from each chamber are uniform and equal to the inlets. Such outlets must either equal or exceed the inlet. Any other situation will destroy drying uniformity.

When speaking of air velocity distinction must be made between duct velocity and food contact velocity. If the ducts, and compartment air intakes are constructed as above suggested the food contact air velocity will be from twenty-five to fifty per cent of the duct air velocity, depending on the class of material and the depth of the tray load. The smaller and fewer the air passages through the material the higher the air contact velocity. No accurate rule for determining this factor can be devised. Experience must govern. Such contact velocity should never be permitted to go below 300 feet per minute and 500 feet is preferred.

It will be noted the partitions 42 divide the eduction duct 32 into a plurality of veins or compartments all having substantially the same width and depth. Splitting the duct in this manner has an added advantage in that it eliminates the unequal velocity of the air due to frictional retardation at the ends of the duct. Thus there is no tendency to dry the food in the center of the trays in advance of the food on the ends of the trays.

It will also be noted the fan blowers 21 act as the mixing unit, being positioned in the circulatory duct system where they mix the fresh purified air, the recirculated air passing through the reheating unit 65 and the by-pass 70 and the added moisture and then compress the mixture into the induction duct and air receiving portions of the separate compartments and through the materials to be dehydrated. This subjects the materials to a uniform medium at a uniform pressure and velocity.

In order to avoid rust difficulties all parts of the apparatus coming in contact with the air should be galvanized or made of rustless material.

Changes in detail of construction and arrangement of parts such as would occur to one skilled in the art are to be considered as coming within the scope of the invention as set forth in the appended claims.

I claim:

1. A dehydrating apparatus having in combination, a sterilizing and pre-heating unit, a re-heating unit, means for heating said sterilizing and pre-heating unit and said reheating unit, an induction duct, an eduction duct, a tray cabinet positioned between the induction duct and the eduction duct, a recirculatory duct, a cooling and condensing unit positioned in said recirculatory duct, a fan blower positioned for drawing fresh air through the pre-heating and sterilizing unit and recirculated air through the re-heating unit and compressing the blend into the induction duct and compartments in said tray cabinet and through the material to be dehydrated.

2. A dehydrating apparatus having, in combination, a combined sterilizing and preheating unit, a reheating unit, means for heating said sterilizing and preheating unit and said reheating unit, a cabinet containing a plurality of separate compartments with removable foraminous bottomed and foraminous covered food trays positioned therein, air inlets under the trays on one side and air outlets over the trays on the other side, an induction duct positioned for conducting air to the said inlets, an eduction duct positioned for drawing air out of the compartments through said outlets, said eduction duct being formed of a plurality of veins, a recirculatory duct connecting said eduction duct and said reheating unit, a cooling and condensing unit positioned in said recirculatory duct, a means for removing the condensate, a means for adding moisture to the incoming and recirculated air, an air exit vent, and a fan blower positioned between said induction duct and the said sterilizing and reheating units for drawing fresh outside air through said sterilizing unit and recirculated air through the said reheating unit, mixing them, compressing the blend through the induction duct, inlets and trays, drawing it through said outlets into said eduction duct and causing it to recirculate.

3. A dehydrating apparatus as described in claim 2 in which the combined sterilizing and preheating unit is composed of a member with a plurality of upwardly extending bosses separated by relatively narrow covered fresh air inlet passages and means positioned thereunder for heating said passages adequately to instantly destroy the bacteria, fungi and spores contained in the incoming fresh air.

4. A dehydrating apparatus as described in claim 2 in which the combined sterilizing and preheating unit is composed of a member with a plurality of upwardly extending bosses separated by relatively narrow covered fresh air inlet passages and means positioned thereunder for heating said passages adequately to instantly destroy the bacteria, fungi and spores contained in the incoming fresh air and with a dry air filter positioned in front of the entrance to said passages.

5. An apparatus as described in claim 2 in which said reheating unit is a continuation of the recirculatory duct with a plurality of longitudinally extending fins attached to the bottom thereof and heating means positioned thereunder.

6. A dehydrating apparatus as described in claim 2 in which the reheating unit is superimposed on the combined sterilizing and preheating unit and heated from the same source.

7. A dehydrating apparatus as described in claim 2 in which said cooling and condensing unit comprises a portion of the recirculatory duct with a plurality of longitudinally extending partitions therein and with a surrounding cooling medium jacket.

FORREST S. CHILTON.